US011110783B2

(12) United States Patent
Sävström

(10) Patent No.: US 11,110,783 B2
(45) Date of Patent: Sep. 7, 2021

(54) OUTER WAIST SEAL ASSEMBLY FOR A VEHICLE

(71) Applicant: Volvo Car Corporation, Gothenburg (SE)

(72) Inventor: Jörgen Sävström, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 126 days.

(21) Appl. No.: 16/416,591

(22) Filed: May 20, 2019

(65) Prior Publication Data

US 2020/0369139 A1 Nov. 26, 2020

(51) Int. Cl.
*B60J 1/16* (2006.01)
*B60J 10/86* (2016.01)
*B60J 10/21* (2016.01)

(52) U.S. Cl.
CPC .............. *B60J 10/86* (2016.02); *B60J 10/21* (2016.02)

(58) Field of Classification Search
CPC ................................. B60J 10/86; B60J 10/21
USPC .......................................... 49/374, 376, 377
See application file for complete search history.

(56) References Cited

U.S. PATENT DOCUMENTS

| | | | |
|---|---|---|---|
| 2,568,811 A | 9/1951 | Larsen | |
| 3,742,649 A | 7/1973 | Dochnahl | |
| 4,696,128 A * | 9/1987 | Fukuhara | B60J 10/265 24/297 |
| 5,199,760 A * | 4/1993 | Vering | B60J 10/265 296/146.16 |
| 5,463,831 A | 11/1995 | Shinagawa et al. | |
| 5,740,640 A * | 4/1998 | Yasuda | B60J 10/265 296/146.16 |
| 6,128,859 A * | 10/2000 | Vance | B60J 10/265 49/377 |
| 6,282,840 B1 * | 9/2001 | Vance | B60J 10/265 49/377 |
| 6,811,194 B1 | 11/2004 | Gaertner et al. | |

(Continued)

FOREIGN PATENT DOCUMENTS

JP 2000280743 A 10/2000
JP 3223229 B2 10/2001

OTHER PUBLICATIONS

Oct. 7, 2020 European Search Report issued on International Application No. 20173242.

*Primary Examiner* — Jerry E Redman
(74) *Attorney, Agent, or Firm* — Clements Bernard Walker; Christopher L. Bernard

(57) ABSTRACT

An outer waist seal assembly for a vehicle including an exterior body panel, including: an elongate body structure adapted to be disposed about an edge of the exterior body panel and including an interior arm adapted to be disposed on an interior side of the exterior body panel and an exterior arm adapted to be disposed on an exterior side of the exterior body panel, the interior arm including a friction structure, lip, rail, channel, or hole disposed on or through an interior surface thereof; and a clip structure adapted to be secured in a slot or hole defined adjacent to the edge of the exterior body panel and engage the friction structure, lip, rail, channel, or hole disposed on or through the interior surface of the interior arm of the elongate body structure, thereby securing the elongate body structure to the exterior body panel.

20 Claims, 6 Drawing Sheets

(56) References Cited

U.S. PATENT DOCUMENTS

| | | | |
|---|---|---|---|
| 8,549,790 B2* | 10/2013 | Murree | B60J 10/30 |
| | | | 49/377 |
| 8,789,313 B2* | 7/2014 | Roll | B60J 10/75 |
| | | | 49/377 |
| 9,003,709 B2* | 4/2015 | Patterson | B60J 10/75 |
| | | | 49/377 |
| 9,169,688 B2* | 10/2015 | Wende | B60J 10/75 |
| 9,840,208 B2* | 12/2017 | Choi | F16B 5/128 |
| 2001/0054261 A1 | 12/2001 | Nozaki et al. | |
| 2010/0300002 A1* | 12/2010 | Ertl | B60J 10/75 |
| | | | 49/489.1 |
| 2013/0093141 A1* | 4/2013 | Guellec | B60J 10/75 |
| | | | 277/637 |
| 2014/0049067 A1 | 2/2014 | Kasuya et al. | |
| 2014/0183901 A1* | 7/2014 | Jun | B60J 10/75 |
| | | | 296/146.2 |

\* cited by examiner

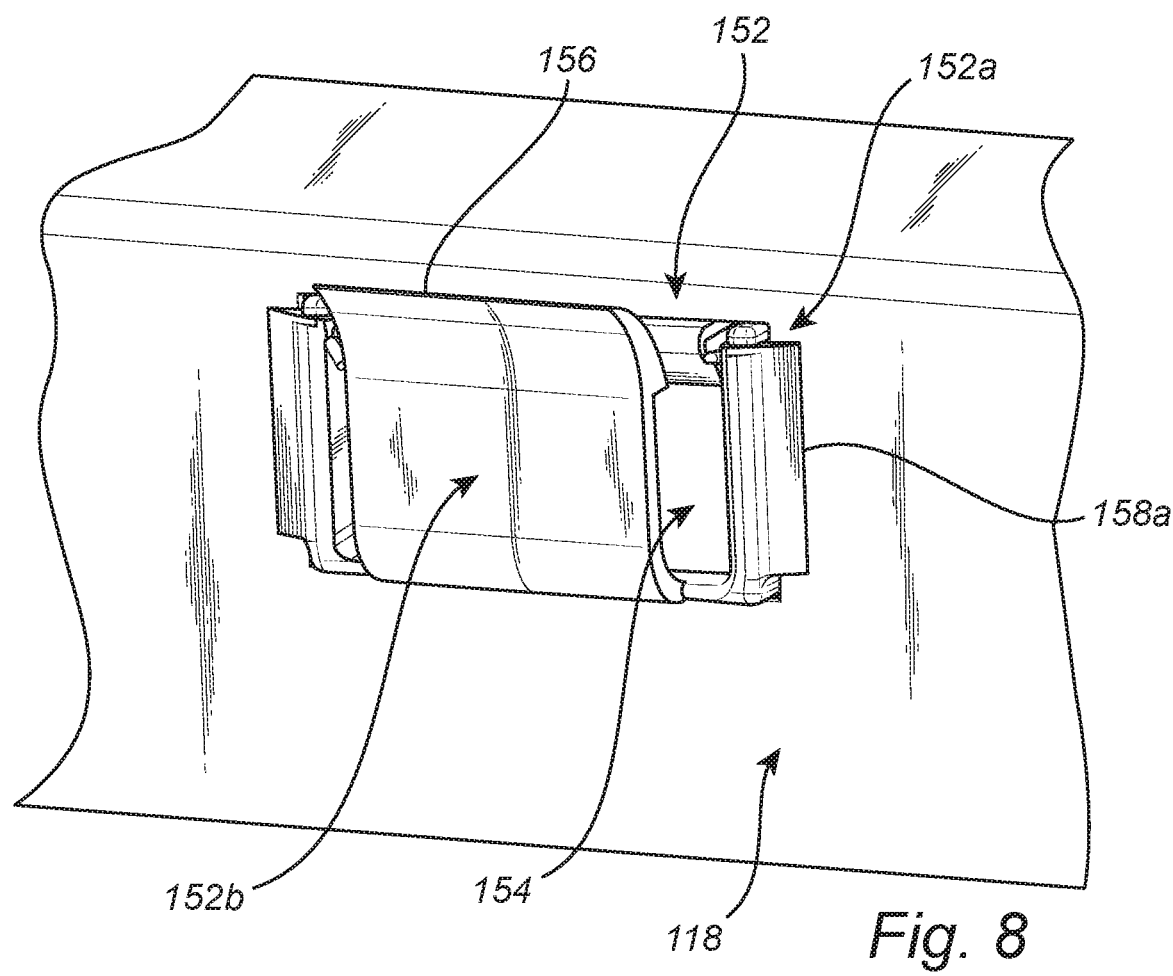
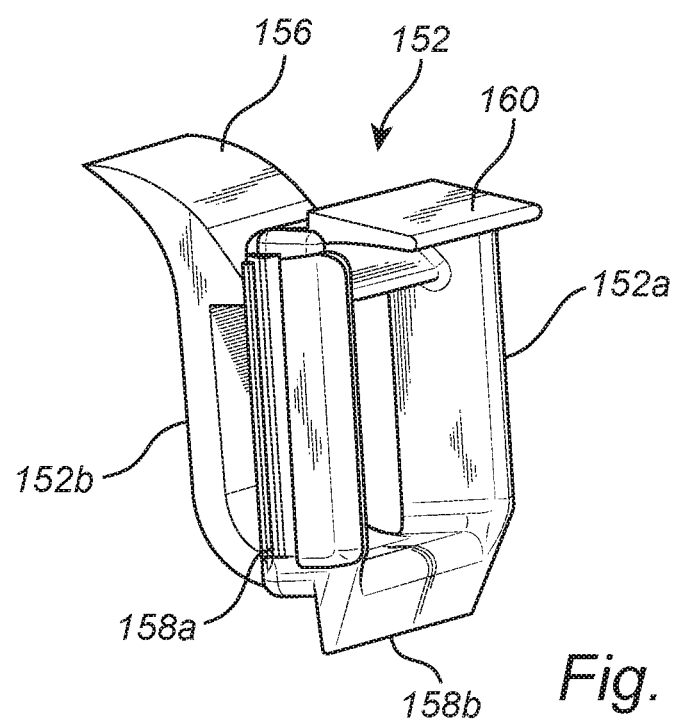

OUTER WAIST SEAL ASSEMBLY FOR A VEHICLE

TECHNICAL FIELD

The present disclosure relates generally to the automotive field. More particularly, the present disclosure relates to an outer waist seal assembly for a vehicle.

BACKGROUND

For most vehicles, the area where the sheet metal of a door, door frame, or side panel meets a window is finished with an outer waist seal (OWS). This OWS consists of an elongate strip of a rigid and/or flexible material that generally covers the edge, and especially the top edge, of the sheet metal and abuts the window, bridging and sealing the gap between the two and creating a finished exterior appearance. It is desirable that the OWS may be installed by hand, with less than about 50 N of force, but this is generally not the case and installers often resort to the use of a hammer or mallet to install the OWS, potentially damaging the OWS and surrounding components. It is also desirable that the OWS does not come loose when flexed by the relative movement of the surrounding components due to vehicle motion, ultraviolet (UV) heating, and/or the like. It is further desirable that the OWS is relatively simple and inexpensive to manufacture.

A conventional OWS is illustrated in FIGS. 1 and 2. Generally, the OWS 10 includes an elongate body structure 12 that is manufactured from a rigid or semi-rigid polymeric material or the like. An elongate trim structure 14 is coupled to the exterior portion of the elongate body structure 12 and is manufactured from a rigid or semi-rigid polymeric or metallic material or the like. An elongate sealing structure 16 is coupled to the interior portion of the elongate body structure 12 and is manufactured from a flexible or semi-rigid elastomeric or polymeric material or the like. The elongate trim structure 14 provides the finished exterior appearance of the vehicle and the elongate sealing structure 16 abuts the window of the vehicle, while the elongate body structure 12 bridges the gap between the sheet metal 18 (FIG. 2) of the vehicle and the window. Conventionally, the elongate body structure 12 includes an interior arm 12a and an exterior arm 12b (FIG. 2) that are disposed about the edge 18a (FIG. 2) of the sheet metal 18. The interior arm 12a includes a hook structure 20 that selectively engages an associated step structure 22 (FIG. 2) manufactured into the sheet metal 18 on the interior side, thereby securing the elongate body structure 12 to the sheet metal 18. The elongate body structure 12 and the elongate sealing structure 16 include any number and configuration of resilient flanges 24a, 24b (FIG. 2), 24c (FIG. 2), 26a, respectively, adapted to contact the sheet metal 18, window, and/or each other. These resilient flanges 24a, 24b, 24c, 26a may be integrally formed with the interior arm 12a and exterior arm 12b of the elongate body structure 12 and the elongate sealing structure 16 or they may be separate components that are coupled to the interior arm 12a and exterior arm 12b of the elongate body structure 12 and the elongate sealing structure 16. Preferably, the elongate sealing structure 16 and the associated resilient flange 26a are deflectable towards the elongate body structure 12 and the associated resilient flange 24a. Each end of the elongate body structure 12 and the elongate trim structure 16 may also terminate in a suitable end cap or structure 28 (FIG. 1), providing a finished exterior appearance.

Disadvantageously, conventional OWSs 10 are prone to loosening and failure due to lateral forces in the Y-direction caused by movement of the surrounding components due to vehicle motion, UV heating, and/or the like. These lateral forces in the Y-direction cause the OWS 10 to rotate about a pivot point 30 in three distinct areas; the cheater-panel area (see FIG. 3), the window area (see FIG. 4), and the capping area (see FIG. 5). In all of these areas, the lateral forces in the Y-direction cause the OWS 10 to rotate about the pivot point 30 and the hook structure 22 (FIGS. 1 and 2) of the interior arm 12a (FIGS. 1 and 2) of the OWS 10 may become separated from the associated step structure 22 (FIG. 2) of the sheet metal 18 (FIG. 2). The resilient flanges 24a (FIGS. 1 and 2), 24b (FIG. 2), 24c (FIG. 2), 26a (FIGS. 1 and 2) may also become displaced. The result is that the OWS 10 may come loose and/or fall off, with a new one being unacceptably difficult to install by hand.

SUMMARY

In various exemplary embodiments, the present disclosure provides an improved OWS that is readily installed by hand, with less than about 50 N of force, that does not come loose when flexed by the relative movement of the surrounding components due to vehicle motion, UV heating, and/or the like, and that is relatively simple and inexpensive to manufacture. This OWS can be effectively assembled to a vehicle despite tolerance variations and remains securely installed in the presence of lateral forces in the Y-direction which are typically present due to interaction with the window in the capping area. These lateral forces serve only to further secure the OWS in place.

Generally, the OWS includes an elongate body structure that is manufactured from a rigid or semi-rigid polymeric material or the like. An elongate trim structure is coupled to or integrally formed with the exterior portion of the elongate body structure and is manufactured from a rigid or semi-rigid polymeric or metallic material or the like. An elongate sealing structure is coupled to or integrally formed with the interior portion of the elongate body structure and is manufactured from a flexible or semi-rigid elastomeric or polymeric material or the like. The elongate trim structure provides the finished exterior appearance of the vehicle and the elongate sealing structure abuts the window of the vehicle, while the elongate body structure bridges the gap between the sheet metal of the vehicle and the window, as is conventional. The elongate body structure includes an interior arm and an exterior arm that are disposed about the edge of the sheet metal. Here, the interior arm includes a one or more longitudinal friction structures, lips, rails, and/or channels or one or more longitudinally-arranged holes that are adapted to be engaged by a plurality of clip structures that are selectively disposed in a plurality of transverse slots or holes manufactured into the sheet metal longitudinally along the edge thereof, thereby securing the elongate body structure to the sheet metal. Again, the elongate body structure and the elongate sealing structure include any number and configuration of resilient flanges adapted to contact the sheet metal, window, and/or each other. These resilient flanges may be integrally formed with the interior arm and exterior arm of the elongate body structure and the elongate sealing structure or they may be separate components that are coupled to the interior arm and exterior arm of the elongate body structure and the elongate sealing structure. Preferably, the elongate sealing structure and the associated resilient flange are deflectable towards the elongate body structure and the associated resilient flange. Each end of the elongate body structure and the elongate trim structure may also terminate in a suitable end cap or structure, providing a finished exterior appearance, as is conventional.

In one exemplary embodiment, the present disclosure provides an outer waist seal assembly for a vehicle including an exterior body panel, the outer waist seal assembly including: an elongate body structure adapted to be disposed about an edge of the exterior body panel and including an interior arm adapted to be disposed on an interior side of the exterior body panel and an exterior arm adapted to be disposed on an exterior side of the exterior body panel, wherein the interior arm includes one or more of a friction structure, a lip, a rail, a channel, and a hole disposed on or through an interior surface thereof; and a clip structure adapted to be secured in one or more of a slot and a hole defined adjacent to the edge of the exterior body panel and engage the one or more of the friction structure, the lip, the rail, the channel, and the hole disposed on or through the interior surface of the interior arm of the elongate body structure, thereby securing the elongate body structure to the exterior body panel. The outer waist seal assembly also includes an elongate trim structure one of coupled to and integrally formed with the elongate body structure on an exterior side thereof. The outer waist seal assembly further includes an elongate sealing structure one of coupled to and integrally formed with the elongate body structure on an interior side thereof. The outer waist seal assembly still further includes one or more resilient flanges one or more of coupled to and integrally formed with one or more of the interior arm of the elongate body structure, the exterior arm of the elongate body structure, and the elongate sealing structure. The clip structure includes a hook structure adapted to engage the one or more of the friction structure, the lip, the rail, the channel, and the hole disposed on or through the interior surface of the interior arm of the elongate body structure. The clip structure also includes a base structure adapted to be secured in the one or more of the slot and the hole defined adjacent to the edge of the exterior body panel. The clip structure is adapted to prevent rotation of the elongate body structure with respect to the exterior body panel when a lateral force in the Y-direction is applied to the elongate body structure.

In another exemplary embodiment, the present disclosure provides an exterior body panel assembly for a vehicle, the exterior body panel assembly including: an exterior body panel defining one or more of a slot and a hole adjacent to an edge thereof; wherein the one or more of the slot and the hole is adapted to receive a clip structure adapted to engage one or more of a friction structure, a lip, a rail, a channel, and a hole disposed on or through an interior surface of an interior arm of an elongate body structure, thereby securing the elongate body structure to the exterior body panel; and wherein the edge of the exterior body panel is adapted to receive the interior arm of the elongate body structure on an interior side of the exterior body panel and an exterior arm of the elongate body structure on an exterior side of the exterior body panel. The elongate body structure includes an elongate trim structure one of coupled to and integrally formed with the elongate body structure on an exterior side thereof. The elongate body structure also includes an elongate sealing structure one of coupled to and integrally formed with the elongate body structure on an interior side thereof. The edge of the exterior body panel is also adapted to receive one or more resilient flanges one or more of coupled to and integrally formed with one or more of the interior arm of the elongate body structure and the exterior arm of the elongate body structure. The clip structure includes a hook structure adapted to engage the one or more of the friction structure, the lip, the rail, the channel, and the hole disposed on or through the interior surface of the interior arm of the elongate body structure. The one or more of the slot and the hole is adapted to receive a base structure of the clip structure. The one or more of the slot and the hole and the base structure of the clip structure are collectively adapted to prevent rotation of the elongate body structure with respect to the exterior body panel when a lateral force in the Y-direction is applied to the elongate body structure.

In a further exemplary embodiment, the present disclosure provides a door assembly for a vehicle, the door assembly including: an exterior body panel defining one or more of a slot and a hole adjacent to an edge thereof and an outer waist seal assembly coupled to the exterior body panel, the outer waist seal assembly including: an elongate body structure adapted to be disposed about the edge of the exterior body panel and including an interior arm adapted to be disposed on an interior side of the exterior body panel and an exterior arm adapted to be disposed on an exterior side of the exterior body panel, wherein the interior arm includes one or more of a friction structure, a lip, a rail, a channel, and a hole disposed on or through an interior surface thereof; and a clip structure adapted to be secured in one or more of the slot and the hole defined adjacent to the edge of the exterior body panel and engage the one or more of the friction structure, the lip, the rail, the channel, and the hole disposed on or through the interior surface of the interior arm of the elongate body structure, thereby securing the elongate body structure to the exterior body panel; wherein the clip structure is adapted to prevent rotation of the elongate body structure with respect to the exterior body panel when a lateral force in the Y-direction is applied to the elongate body structure. The door assembly also includes an elongate trim structure one of coupled to and integrally formed with the elongate body structure on an exterior side thereof. The door assembly further includes an elongate sealing structure one of coupled to and integrally formed with the elongate body structure on an interior side thereof. The door assembly still further includes one or more resilient flanges one or more of coupled to and integrally formed with one or more of the interior arm of the elongate body structure, the exterior arm of the elongate body structure, and the elongate sealing structure. The clip structure includes a hook structure adapted to engage the one or more of the friction structure, the lip, the rail, the channel, and the hole disposed on or through the interior surface of the interior arm of the elongate body structure. The clip structure also includes a base structure adapted to be secured in the one or more of the slot and the hole defined adjacent to the edge of the exterior body panel.

BRIEF DESCRIPTION OF THE DRAWINGS

The present disclosure is illustrated and described herein with reference to the various drawings, in which like reference number are used to denote like assembly components/method steps, as appropriate, and in which:

FIG. 8 is another partial perspective view of one exemplary embodiment of the clip structure of the OWS assembly of the present disclosure coupled to the sheet metal of a vehicle; and FIG. 9 is a further partial perspective view of one exemplary embodiment of the clip structure of the OWS assembly of the present disclosure.

DESCRIPTION OF EMBODIMENTS

Again, in various exemplary embodiments, the present disclosure provides an improved OWS that is readily installed by hand, with less than about 50 N of force, that does not come loose when flexed by the relative movement of the surrounding components due to vehicle motion, UV heating, and/or the like, and that is relatively simple and inexpensive to manufacture. This OWS can be effectively assembled to a vehicle despite tolerance variations and remains securely installed in the presence of lateral forces in the Y-direction which are typically present due to interaction with the window in the capping area. These lateral forces serve only to further secure the OWS in place.

Generally, the OWS includes an elongate body structure that is manufactured from a rigid or semi-rigid polymeric material or the like. An elongate trim structure is coupled to or integrally formed with the exterior portion of the elongate body structure and is manufactured from a rigid or semi-rigid polymeric or metallic material or the like. An elongate sealing structure is coupled to or integrally formed with the interior portion of the elongate body structure and is manufactured from a flexible or semi-rigid elastomeric or polymeric material or the like. The elongate trim structure provides the finished exterior appearance of the vehicle and the elongate sealing structure abuts the window of the vehicle, while the elongate body structure bridges the gap between the sheet metal of the vehicle and the window, as is conventional. The elongate body structure includes an interior arm and an exterior arm that are disposed about the edge of the sheet metal. Here, the interior arm includes a one or more longitudinal friction structures, lips, rails, and/or channels or one or more longitudinally-arranged holes that are adapted to be engaged by a plurality of clip structures that are selectively disposed in a plurality of transverse slots or holes manufactured into the sheet metal longitudinally along the edge thereof, thereby securing the elongate body structure to the sheet metal. Again, the elongate body structure and the elongate sealing structure include any number and configuration of resilient flanges adapted to contact the sheet metal, window, and/or each other. These resilient flanges may be integrally formed with the interior arm and exterior arm of the elongate body structure and the elongate sealing structure or they may be separate components that are coupled to the interior arm and exterior arm of the elongate body structure and the elongate sealing structure. Preferably, the elongate sealing structure and the associated resilient flange are deflectable towards the elongate body structure and the associated resilient flange. Each end of the elongate body structure and the elongate trim structure may also terminate in a suitable end cap or structure, providing a finished exterior appearance, as is conventional.

Figure 1:
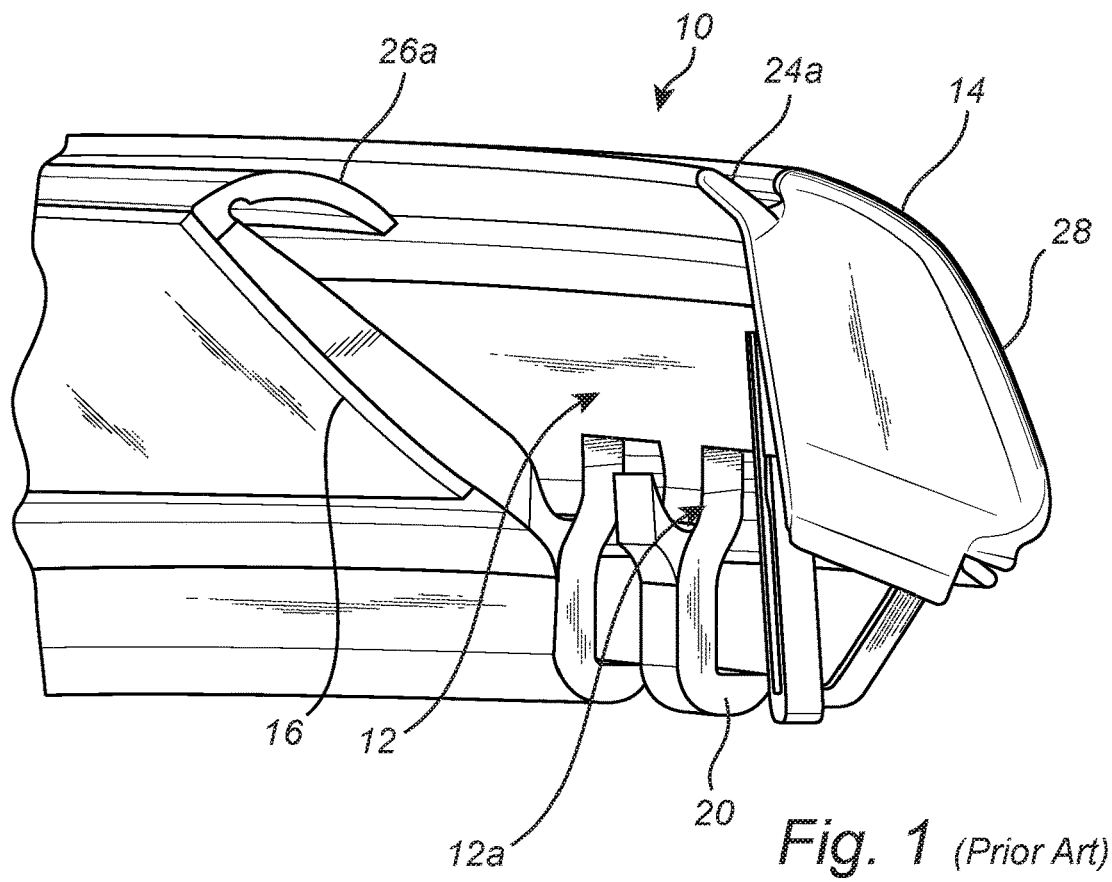
FIG. 1 is a partial perspective view of a conventional OWS.
Figure 2:
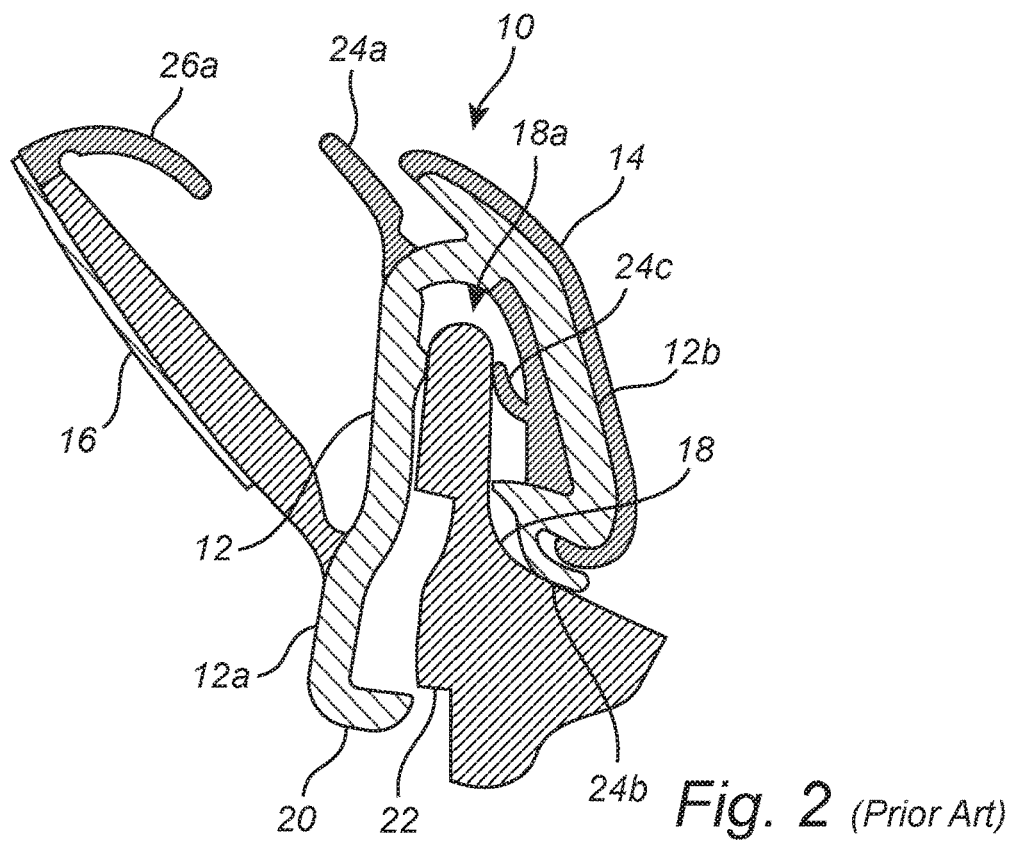
FIG. 2 is a cross-sectional side view of a conventional OWS coupled to the sheet metal of a vehicle.
Figure 3:
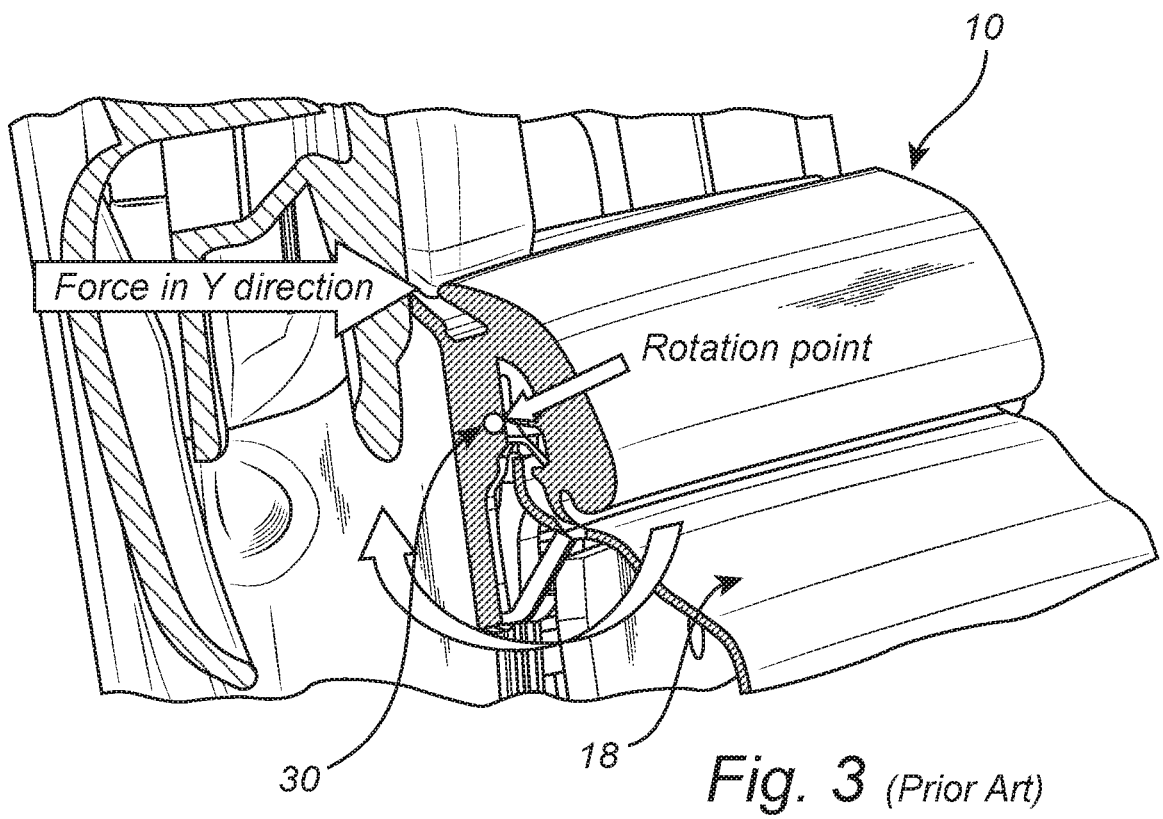
FIG. 3 is a partial perspective view of a conventional OWS coupled to the sheet metal of a vehicle and undesirably pivoting in the associated cheater-panel area under a lateral force in the Y-direction.
Figure 4:
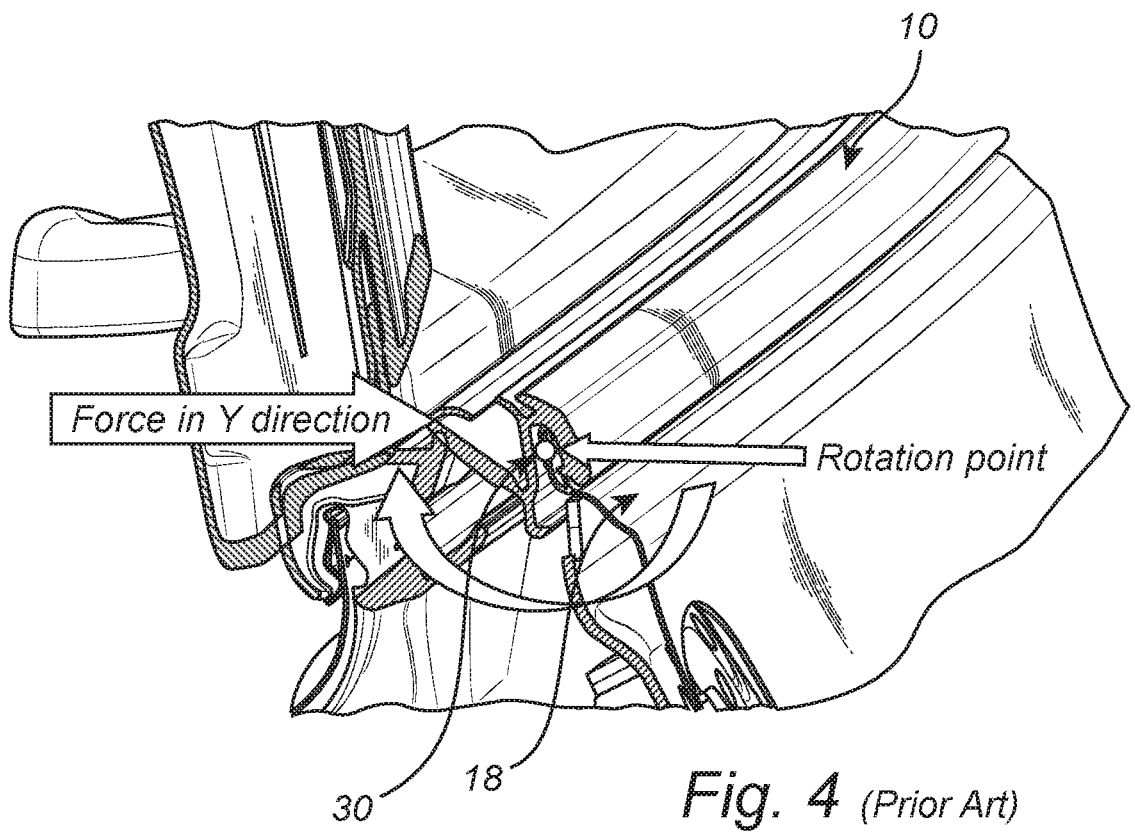
FIG. 4 is a partial perspective view of a conventional OWS coupled to the sheet metal of a vehicle and undesirably pivoting in the associated window area under a lateral force in the Y-direction.
Figure 5:
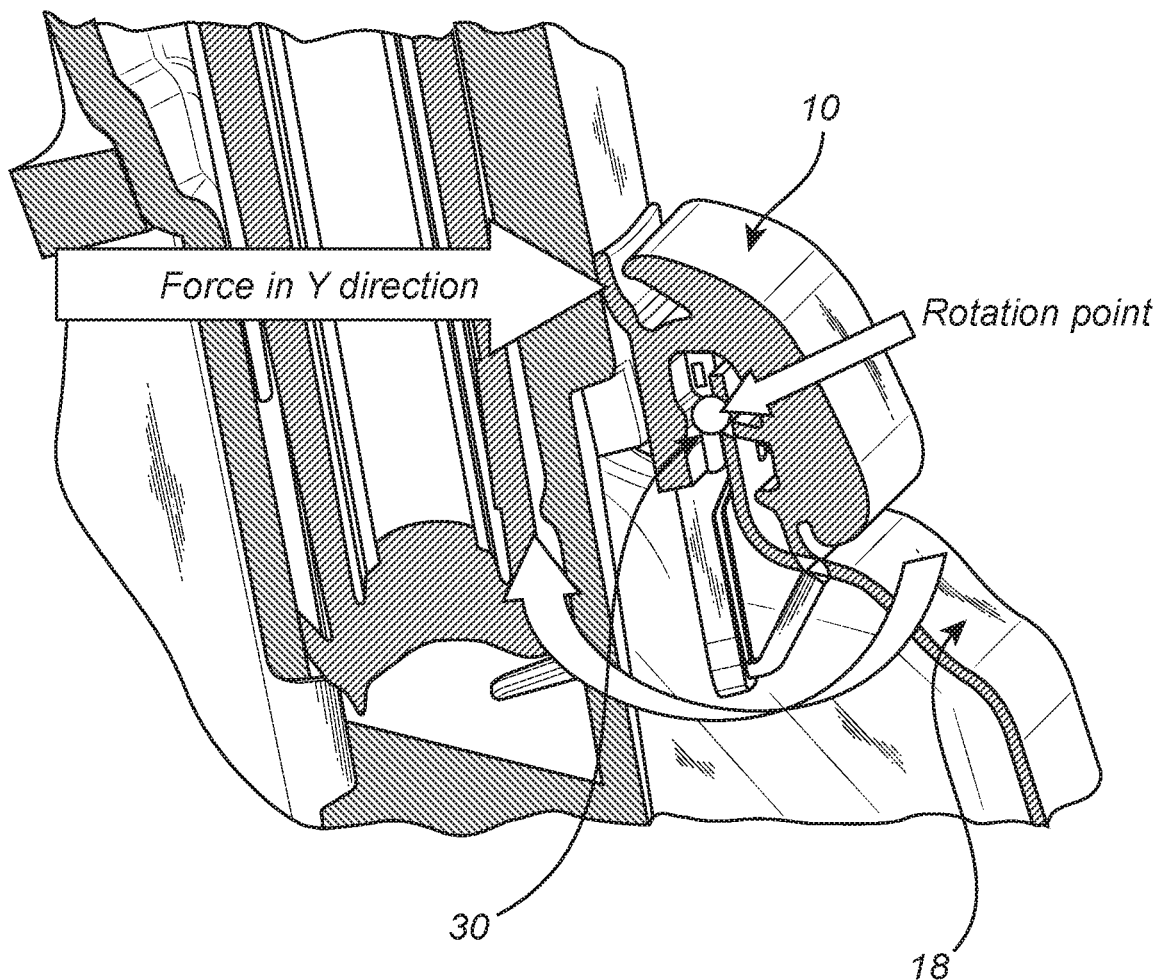
FIG. 5 is a partial perspective view of a conventional OWS coupled to the sheet metal of a vehicle and undesirably pivoting in the associated capping area under a lateral force in the Y-direction.
Figure 6:
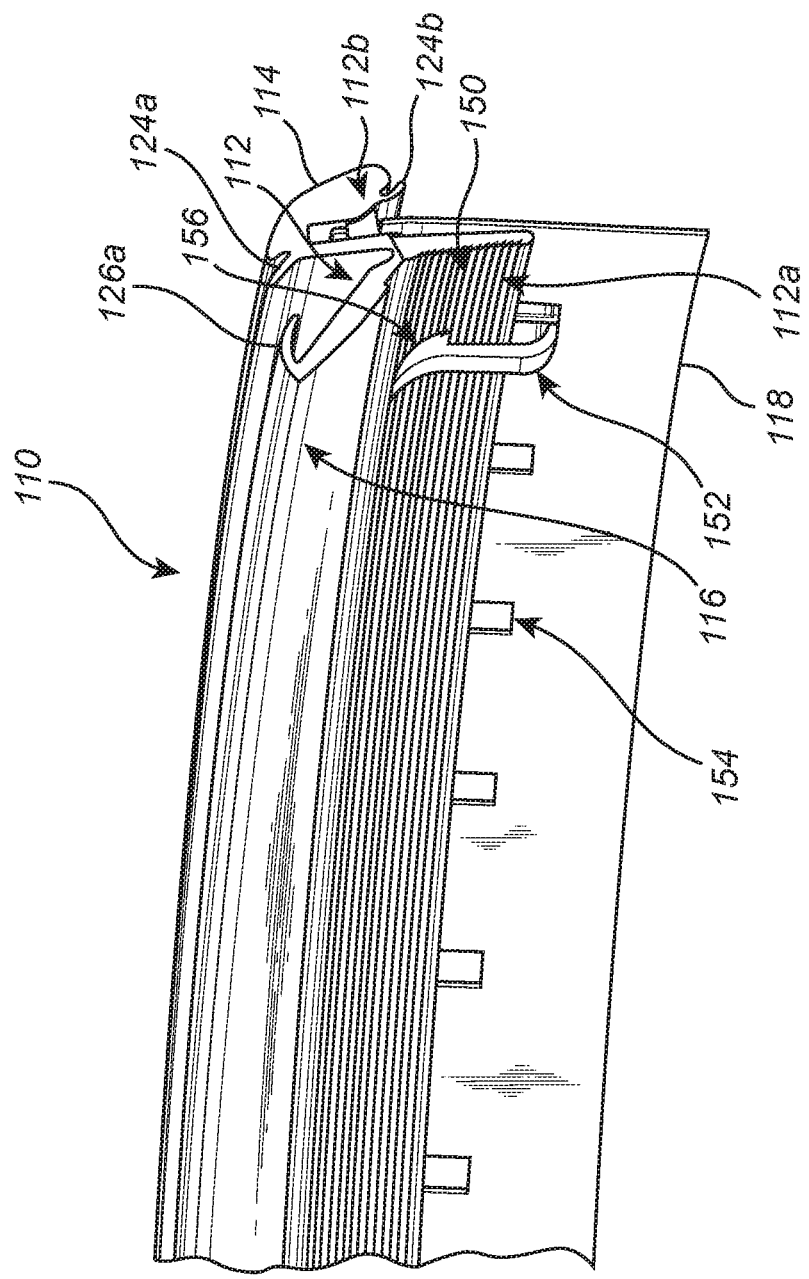
FIG. 6 is a partial perspective view of one exemplary embodiment of the OWS assembly of the present disclosure coupled to the sheet metal of a vehicle.

Referring now specifically to FIG. 6, in one exemplary embodiment, the OWS 110 includes the elongate body structure 112 that is manufactured from a rigid or semi-rigid polymeric material or the like. Typically, this elongate body structure 112 has a length that substantially corresponds to the length of the bottom portion of the associated window or the like, for example. The elongate trim structure 114 is coupled to or integrally formed with the exterior portion of the elongate body structure 112 and is manufactured from a rigid or semi-rigid polymeric or metallic material or the like. The elongate trim structure 114 has a length that substantially corresponds to that of the elongate body structure 112. The elongate sealing structure 116 is coupled to or integrally formed with the interior portion of the elongate body structure 112 and is manufactured from a flexible or semi-rigid elastomeric or polymeric material or the like. The elongate sealing structure 116 has a length that substantially corresponds to that of the elongate body structure 112 and the elongate trim structure 114. The elongate trim structure 114 provides the finished exterior appearance of the vehicle and the elongate sealing structure 116 abuts the associated window of the vehicle, while the elongate body structure 112 bridges the gap between the sheet metal 118 of the vehicle and the window, as is conventional. Thus, the OWS 110 is a multi-component or unitary structure that effectively seals the gap between the sheet metal 118 of an exterior body panel and the associated window, providing a finished exterior appearance while allowing for motion of the window and/or a certain degree of flexing. The elongate body structure 112 includes the interior arm 112a and the exterior arm 112b that are disposed about the edge of the sheet metal 118. In the exemplary embodiment illustrated, the interior arm 112a is significantly longer that the exterior arm 112b, the latter of which can be quite short. The interior arm 112a includes a one or more longitudinal friction structures, lips, rails, and/or channels or one or more longitudinally-arranged holes 150 that are adapted to be engaged by a plurality of clip structures 152 that are selectively disposed in a plurality of transverse slots or holes 154 manufactured into the sheet metal 118 longitudinally along the edge thereof, thereby securing the elongate body structure 112 to the sheet metal 118. In the exemplary embodiment illustrated, the clip structures 152 are secured in vertical slots 154 manufactured into the sheet metal 118 and include hook structures 156 that engage longitudinal ridges and channels 150 manufactured onto the interior surface of the interior arm 112a of the elongate body structure 112a. Here, the interior arm 112a extends down the edge of the sheet metal 118 almost the whole length of the vertical slots 154 and has a generally tapering wedge shape. Other suitable configurations may of course be utilized.

Again, the elongate body structure 112 and the elongate sealing structure 116 can include any number and configuration of resilient flanges 124a, 124b, 126a adapted to contact the sheet metal 118, window, and/or each other, providing the desired resilient sealing properties. These resilient flanges 124a, 124b, 126a may be integrally formed with the interior arm 112a and exterior arm 112b of the elongate body structure 112 and the elongate sealing structure 116 or they may be separate components that are coupled to the interior arm 112*a* and exterior arm 112*b* of the elongate body structure 112 and the elongate sealing structure 116. Preferably, the elongate sealing structure 116 and the associated resilient flange 126*a* are deflectable towards the elongate body structure 112 and the associated resilient flange 124*a*. In the exemplary embodiment illustrated, the resilient flange 126*a* of the elongate sealing structure 116 contacts the resilient flange 124*a* of the elongate body structure 112 when the elongate sealing structure 116 is deflected by the window towards the elongate body structure 112, with the two flanges 126*a*, 124*a* collectively sealing the gap between the window and the sheet metal 118. The resilient flange 124*b* of the exterior arm 112*b* of the elongate body structure 112 provides a contact seal with the sheet metal 118 along the lower edge of the exterior arm 112*b*. It should be noted that the sheet metal/exterior body panel 118 described herein may utilize a single layer or multiple adjacent or separated layers, the latter forming a prismatic structure. Further, the exterior body panel 118 need not be sheet metal, but may utilize other metallic/non-metallic materials as well.

Each end of the elongate body structure 112 and the elongate trim structure 114 may also terminate in a suitable end cap or structure, providing a finished exterior appearance, as is conventional.

Figure 7:
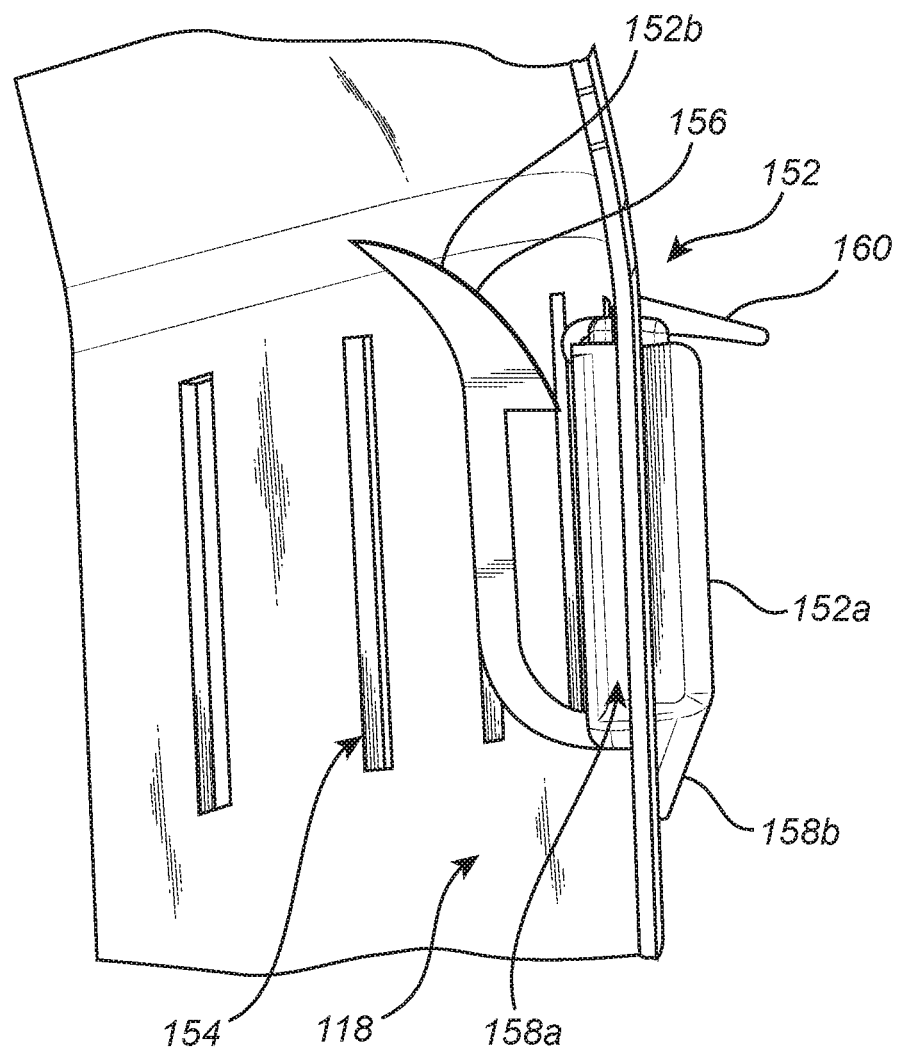
FIG. 7 is a partial perspective view of one exemplary embodiment of the clip structure of the OWS assembly of the present disclosure coupled to the sheet metal of a vehicle.

FIGS. 7-9 illustrate the interaction of the clip structure 152 and the rectangular slot 154 (FIGS. 7 and 8) of the exterior body panel 118 (FIGS. 7 and 8) in greater detail. Here, the clip structure 152 includes a rectangular base structure 152*a* that substantially conforms to the shape of the associated rectangular slot 154 and a coupled retention arm 152*b* that provides the desired retaining spring force against the interior arm 112*a* (FIG. 6) of the elongate body structure 112 (FIG. 6) when the elongate body structure 112 is engaged with the exterior body panel 118. The retention arm 152*b* includes the hook structure 156 that securely engages the retention structure(s) 150 (FIG. 6) manufactured into the interior surface of the interior arm 112*a* of the elongate body structure 112. The hook structure 156 may have an interior-biased bend and/or taper at a top portion thereof to facilitate insertion of the interior arm 112*a* into the retention arm 152*b* during assembly of the elongate body structure 112 onto the edge of the exterior body panel 118. Preferably, the rectangular base structure 152*a* includes one or more interior edge flanges 158*a* and one or more exterior edge flanges 158*b* (FIGS. 7 and 9) that, when the rectangular base structure 152*a* is disposed through and into the associated rectangular slot 154, the rectangular base structure 152*a* cannot pass completely through the rectangular slot 154 or back out of the rectangular slot 154, respectively. In the exemplary embodiment illustrated, a deflectable locking tab 160 is provided to "snap-lock" the rectangular base structure 152*a* into the rectangular slot 154, thereby providing disengageable securement between the two components. It is contemplated herein that the clip structure 152 is manufactured from a rigid plastic or metallic material, however, the retention arm 152*b* and the deflectable locking tab 160 should be elastically deformable to a degree, such that they may provide the desired retaining spring force and be actuatable, respectively.

It will be readily apparent to those of ordinary skill in the art that other suitable slot and clip configurations may be used equally. For example, the rectangular slot 154 may be replaced by a hole, with a series of such holes being arranged longitudinally along the edge of the exterior body panel 118. Likewise, a longitudinal channel could be used, which would allow the adjacent clip structures 152 to translate along the edge of the exterior body panel 118. The rectangular base structure 152*a* of the clip structure 152 can have any suitable shape and/or dimensions and may utilize alternative flange and retention configurations. For example, the clip structure 152 could be welded or otherwise bonded to the exterior body panel 118, as opposed to being removably attached to the exterior body panel 118.

Thus, again, in various exemplary embodiments, the present disclosure provides an improved OWS that is readily installed by hand, with less than about 50 N of force, that does not come loose when flexed by the relative movement of the surrounding components due to vehicle motion, UV heating, and/or the like, and that is relatively simple and inexpensive to manufacture. This OWS can be effectively assembled to a vehicle despite tolerance variations and remains securely installed in the presence of lateral forces in the Y-direction which are typically present due to interaction with the window in the capping area. These lateral forces serve only to further secure the OWS in place.

Generally, the OWS includes an elongate body structure that is manufactured from a rigid or semi-rigid polymeric material or the like. An elongate trim structure is coupled to or integrally formed with the exterior portion of the elongate body structure and is manufactured from a rigid or semi-rigid polymeric or metallic material or the like. An elongate sealing structure is coupled to or integrally formed with the interior portion of the elongate body structure and is manufactured from a flexible or semi-rigid elastomeric or polymeric material or the like. The elongate trim structure provides the finished exterior appearance of the vehicle and the elongate sealing structure abuts the window of the vehicle, while the elongate body structure bridges the gap between the sheet metal of the vehicle and the window, as is conventional. The elongate body structure includes an interior arm and an exterior arm that are disposed about the edge of the sheet metal. Here, the interior arm includes a one or more longitudinal friction structures, lips, rails, and/or channels or one or more longitudinally-arranged holes that are adapted to be engaged by a plurality of clip structures that are selectively disposed in a plurality of transverse slots or holes manufactured into the sheet metal longitudinally along the edge thereof, thereby securing the elongate body structure to the sheet metal. Again, the elongate body structure and the elongate sealing structure include any number and configuration of resilient flanges adapted to contact the sheet metal, window, and/or each other. These resilient flanges may be integrally formed with the interior arm and exterior arm of the elongate body structure and the elongate sealing structure or they may be separate components that are coupled to the interior arm and exterior arm of the elongate body structure and the elongate sealing structure. Preferably, the elongate sealing structure and the associated resilient flange are deflectable towards the elongate body structure and the associated resilient flange. Each end of the elongate body structure and the elongate trim structure may also terminate in a suitable end cap or structure, providing a finished exterior appearance, as is conventional.

Although the present disclosure is illustrated and described herein with reference to preferred embodiments and specific examples thereof, it will be readily apparent to those of ordinary skill in the art that other embodiments may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. An outer waist seal assembly for a vehicle including an exterior body panel, the outer waist seal assembly comprising:
an elongate body structure adapted to be disposed about an edge of the exterior body panel and comprising an interior arm adapted to be disposed on an interior side of the exterior body panel and an exterior arm adapted to be disposed on an exterior side of the exterior body panel, wherein the interior arm comprises one or more of a friction structure, a lip, a rail, and a channel disposed on or through an interior surface thereof; and
a clip structure adapted to be secured in one or more of a slot and a hole defined adjacent to the edge of the exterior body panel and engage the one or more of the friction structure, the lip, the rail, and the channel disposed on or through the interior surface of the interior arm of the elongate body structure, thereby securing the elongate body structure to the exterior body panel, wherein the clip structure is adapted to be disposed on the interior side of the exterior body panel below the edge thereof, and wherein the clip structure comprises a base structure secured in the one or more of the slot and the hole defined adjacent to the edge of the exterior body panel, the base structure comprising one or more exterior flanges which passes through the hole and contacts an exterior surface of the exterior body panel.

2. The outer waist seal assembly of claim 1, further comprising an elongate trim structure one of coupled to and integrally formed with the elongate body structure on an exterior side thereof.

3. The outer waist seal assembly of claim 1, further comprising an elongate sealing structure one of coupled to and integrally formed with the elongate body structure on an interior side thereof.

4. The outer waist seal assembly of claim 3, further comprising one or more resilient flanges one or more of coupled to and integrally formed with one or more of the interior arm of the elongate body structure, the exterior arm of the elongate body structure, and the elongate sealing structure.

5. The outer waist seal assembly of claim 1, wherein the clip structure comprises a hook structure adapted to engage the one or more of the friction structure, the lip, the rail, and the channel disposed on or through the interior surface of the interior arm of the elongate body structure.

6. The outer waist seal assembly of claim 1, wherein the clip structure is adapted to prevent rotation of the elongate body structure with respect to the exterior body panel when a lateral force in the Y-direction is applied to the elongate body structure.

7. The outer waist seal assembly of claim 1, wherein the base structure of the clip structure further comprises one or more interior flanges adapted to contact an interior surface of the exterior body panel.

8. An exterior body panel assembly for a vehicle, the exterior body panel assembly comprising:
an exterior body panel defining one or more of a slot and a hole adjacent to an edge thereof;
wherein the one or more of the slot and the hole is adapted to receive a clip structure adapted to engage one or more of a friction structure, a lip, a rail, and a channel disposed on or through an interior surface of an interior arm of an elongate body structure, thereby securing the elongate body structure to the exterior body panel;
wherein the edge of the exterior body panel is adapted to receive the interior arm of the elongate body structure on an interior side of the exterior body panel and an exterior arm of the elongate body structure on an exterior side of the exterior body panel; and
wherein the clip structure is adapted to be disposed on the interior side of the exterior body panel below the edge thereof, and wherein the clip structure comprises a base structure secured in the one or more of the slot and the hole defined adjacent to the edge of the exterior body panel, the base structure comprising one or more exterior flanges which passes through the hole and contacts an exterior surface of the exterior body panel.

9. The exterior body panel assembly of claim 8, wherein the elongate body structure includes an elongate trim structure one of coupled to and integrally formed with the elongate body structure on an exterior side thereof.

10. The exterior body panel assembly of claim 8, wherein the elongate body structure includes an elongate sealing structure one of coupled to and integrally formed with the elongate body structure on an interior side thereof.

11. The exterior body panel assembly of claim 8, wherein the edge of the exterior body panel is further adapted to receive one or more resilient flanges one or more of coupled to and integrally formed with one or more of the interior arm of the elongate body structure and the exterior arm of the elongate body structure.

12. The exterior body panel assembly of claim 8, wherein the clip structure includes a hook structure adapted to engage the one or more of the friction structure, the lip, the rail, and the channel disposed on or through the interior surface of the interior arm of the elongate body structure.

13. The exterior body panel assembly of claim 8, wherein the one or more of the slot and the hole and the base structure of the clip structure are collectively adapted to prevent rotation of the elongate body structure with respect to the exterior body panel when a lateral force in the Y-direction is applied to the elongate body structure.

14. The exterior body panel assembly of claim 8, wherein the base structure of the clip structure further comprises one or more interior flanges adapted to contact an interior surface of the exterior body panel.

15. A door assembly for a vehicle, the door assembly comprising:
an exterior body panel defining one or more of a slot and a hole adjacent to an edge thereof; and
an outer waist seal assembly coupled to the exterior body panel, the outer waist seal assembly comprising:
an elongate body structure adapted to be disposed about the edge of the exterior body panel and comprising an interior arm adapted to be disposed on an interior side of the exterior body panel and an exterior arm adapted to be disposed on an exterior side of the exterior body panel, wherein the interior arm comprises one or more of a friction structure, a lip, a rail, and a channel disposed on or through an interior surface thereof; and
a clip structure adapted to be secured in one or more of the slot and the hole defined adjacent to the edge of the exterior body panel and engage the one or more of the friction structure, the lip, the rail, and the channel disposed on or through the interior surface of the interior arm of the elongate body structure, thereby securing the elongate body structure to the exterior body panel, wherein the clip structure is adapted to be disposed on the interior side of the exterior body panel below the edge thereof, and wherein the clip structure comprises a base structure secured in the one or more of the slot and the hole defined adjacent to the edge of the exterior body panel, the base structure comprising one or more exterior flanges which passes through the hole and contacts an exterior surface of the exterior body panel;

wherein the clip structure is adapted to prevent rotation of the elongate body structure with respect to the exterior body panel when a lateral force in the Y-direction is applied to the elongate body structure.

16. The door assembly of claim 15, further comprising an elongate trim structure one of coupled to and integrally formed with the elongate body structure on an exterior side thereof.

17. The door assembly of claim 15, further comprising an elongate sealing structure one of coupled to and integrally formed with the elongate body structure on an interior side thereof.

18. The door assembly of claim 17, further comprising one or more resilient flanges one or more of coupled to and integrally formed with one or more of the interior arm of the elongate body structure, the exterior arm of the elongate body structure, and the elongate sealing structure.

19. The door assembly of claim 15, wherein the clip structure comprises a hook structure adapted to engage the one or more of the friction structure, the lip, the rail, and the channel disposed on or through the interior surface of the interior arm of the elongate body structure.

20. The door assembly of claim 15, wherein the base structure of the clip structure further comprises one or more interior flanges adapted to contact an interior surface of the exterior body panel.

\* \* \* \* \*